(12) United States Patent
Brunk (10) Patent No.: US 7,958,365 B2
(45) Date of Patent: *Jun. 7, 2011

(54) USING CLASSIFICATION TECHNIQUES IN DIGITAL WATERMARKING

(75) Inventor: Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/408,529

(22) Filed: Mar. 20, 2009

(65) Prior Publication Data

US 2010/0074466 A1    Mar. 25, 2010

Related U.S. Application Data

(63) Continuation of application No. 09/587,493, filed on Jun. 2, 2000, now Pat. No. 7,508,944.

(51) Int. Cl.
*G06F 21/00* (2006.01)

(52) U.S. Cl. ........ 713/176; 382/100; 382/183; 382/250; 380/202; 380/252

(58) Field of Classification Search .................. 713/176; 382/100, 183, 250, 500; 380/202, 252
See application file for complete search history.

(56) References Cited

U.S. PATENT DOCUMENTS

| | | | |
|---|---|---|---|
| 5,046,100 A | 9/1991 | Thomson | |
| 5,511,009 A | 4/1996 | Pastor | |
| 5,613,004 A | 3/1997 | Cooperman et al. | |
| 5,659,726 A | 8/1997 | Sandford et al. | |
| 5,664,018 A | 9/1997 | Leighton | |
| 5,684,922 A | 11/1997 | Miyakawa et al. | |
| 5,748,763 A | 5/1998 | Rhoads | |
| 5,809,139 A | 9/1998 | Girod et al. | |
| 5,809,455 A | 9/1998 | Nishiguchi et al. | |
| 5,819,289 A | 10/1998 | Sanford et al. | |
| 5,859,920 A | 1/1999 | Daly et al. | |
| 6,026,193 A | 2/2000 | Rhoads | |
| 6,031,914 A | 2/2000 | Tewfik et al. | |
| 6,108,434 A | 8/2000 | Cox et al. | |
| 6,111,990 A | 8/2000 | Sugaya et al. | |
| 6,154,571 A | 11/2000 | Cox et al. | |
| 6,185,312 B1 | 2/2001 | Nakamura et al. | |

(Continued)

FOREIGN PATENT DOCUMENTS

EP    1 132 895    11/2004

(Continued)

OTHER PUBLICATIONS

"Bayesian Denoising of Visual Images in the Wavelet Domain", Eero P. Simoncelli, Published as: "Bayesian Inference in Wavelet Based Models", eds. P. Muller and B Vidakovic, Chapter 18, pp. 291-308, Lecture Notes in Statistics, vol. 141, Springer-Verlag, New York, 1999.

(Continued)

*Primary Examiner* — Carl Colin (57) ABSTRACT

A classification scheme assigns samples of the watermarked media to classes based on classification criteria indicating a likely presence of a watermarked signal. Once classified, the scheme determines statistical characteristics of the media signal for the classes, and assigns a figure of merit to the samples in each class. A watermark decoder (e.g., reader and/or detector) use the figure of merit to adapt a watermark decoding function to the statistical features of the classes, such as weighting to samples to improve watermark decoding.

20 Claims, 3 Drawing Sheets

U.S. PATENT DOCUMENTS

| | | | |
|---|---|---|---|
| 6,222,932 B1 * | 4/2001 | Rao et al. ............... 382/100 |
| 6,249,870 B1 | 6/2001 | Kobayashi et al. |
| 6,304,966 B1 | 10/2001 | Shimizu |
| 6,330,672 B1 | 12/2001 | Shur |
| 6,330,673 B1 | 12/2001 | Levine |
| 6,359,573 B1 | 3/2002 | Taruguchi et al. |
| 6,442,284 B1 | 8/2002 | Gustafson et al. |
| 6,466,908 B1 | 10/2002 | Baggenstoss |
| 6,473,516 B1 | 10/2002 | Kawaguchi et al. |
| 6,477,276 B1 | 11/2002 | Inoue et al. |
| 6,522,767 B1 | 2/2003 | Moskowitz et al. |
| 6,535,617 B1 | 3/2003 | Hannigan et al. |
| 6,539,475 B1 | 3/2003 | Cox et al. |
| 6,611,608 B1 | 8/2003 | Wu et al. |
| 6,618,489 B1 | 9/2003 | Miyashita |
| 6,636,617 B1 | 10/2003 | Sugahara et al. |
| 6,665,419 B1 * | 12/2003 | Oami ............... 382/100 |
| 6,683,966 B1 | 1/2004 | Tian et al. |
| 6,728,408 B1 | 4/2004 | Echizen et al. |
| 6,768,807 B1 | 7/2004 | Muratani |
| 6,826,289 B1 | 11/2004 | Hashimoto |
| 7,006,663 B2 | 2/2006 | Acharya et al. |
| 7,065,226 B1 | 6/2006 | Anzai et al. |
| 2001/0017709 A1 | 8/2001 | Murakami et al. |
| 2001/0026616 A1 | 10/2001 | Tanaka |
| 2001/0028727 A1 | 10/2001 | Naito et al. |
| 2001/0046307 A1 | 11/2001 | Wong |
| 2002/0057823 A1 | 5/2002 | Sharma et al. |
| 2002/0090110 A1 | 7/2002 | Braudaway et al. |

FOREIGN PATENT DOCUMENTS

| | | |
|---|---|---|
| WO | WO-01/06755 | 1/2001 |

OTHER PUBLICATIONS

Alattar, "Smart Images" Using Digimarc's Watermarking Technology, SPIE 12.sup. Int'l Symposium on Electronic Imaging, Jan. 2000, vol. 3971, No. 25, pp. 1-10.

Chen et al., "Adaptive Coding of Monochrome and Color Images", IEEE Transactions on Communication, vol. Com-25, No. 11, Nov. 1977, pp. 1285-1292.

Dautzenberg, Watermarking Images, Dept. of Microelectronics and Electrical Engineering, Trinity College, Dublin, Oct. 1994, 58 pages.

Final Office Action on U.S. Appl. No. 09/587,493, mailed Sep. 24, 2004.

Hernandez et al., "Statistical Analysis of Watermarking Schemes for Copyright Protection of Images", Proceeding of the IEEE, vol. 87, No. 7, Jul. 1999.

International Preliminary Examination Report for PCT/US01/17685, completed Dec. 21, 2002.

International Search Report for PCT/US01/17685, mailed Nov. 26, 2001.

Jafarkhani et al., "Adaptive Image Coding Using Spectral Classification", Department of Electrical Engineering and Institute for Systems Research, Jul. 16, 1996, 15 pages.

Joshi et al, "Comparison of Different Methods of Classification in Subband Coding of Images", IEEE Trans, Image Proc., Nov. 1997, 26 pages.

Mohan S. Kankanhalli, Rajmohan, K. R. Ramakrishnan, "Content Based Watermarking of Images", 1998, ACM Multimedia pp. 61-70.

Non-final Office Action on U.S. Appl. No. 09/587,493, mailed Aug. 9, 2005.

Non-Final Office Action on U.S. Appl. No. 09/587,493, mailed Nov. 17, 2003.

Non-Final Office Action on U.S. Appl. No. 09/587,493, mailed Sep. 17, 2007.

Notice of Allowance on U.S. Appl. No. 09/587,493, mailed Apr. 4, 2008.

Notice of Allowance on U.S. Appl. No. 09/587,593, mailed May 14, 2007.

Van Schyndel et al., "Towards a Robust Digital Watermark," Second Asian Conf. on Computer Vision, Dec. 5, 1995, pp. 504-508.

* cited by examiner

USING CLASSIFICATION TECHNIQUES IN DIGITAL WATERMARKING

TECHNICAL FIELD

This application is a continuation of U.S. patent application Ser. No. 09/587,493, filed Jun. 2, 2000 (now U.S. Pat. No. 7,508,944) and is hereby incorporated by reference.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reader extracts this information from the detected watermark.

One challenge to the developers of watermark embedding and reading systems is to ensure that the watermark is detectable even if the watermarked media content is corrupted in some fashion. The watermark may be corrupted intentionally, so as to bypass its copy protection or anti-counterfeiting functions, or unintentionally through various transformations that result from routine manipulation of the content. In the case of watermarked images, such manipulation of the image may distort the watermark pattern embedded in the image.

The watermark embedder can improve detectability by increasing the strength of the watermark signal. However, as the strength of the signal increases, it tends to become more noticeable. Thus, there is a trade-off between making the watermark detectable by the decoder, yet imperceptible during playback or display of the media content.

The disclosure describes methods for classifying data samples in watermarked media to enhance watermark detection and reading operations. One aspect of the disclosure is a method for reading a digital watermark in a media signal. The method uses a programmed computer or special purpose hardware to assign sets of media signal samples into classes, compute statistical characteristics of the media samples for the classes, and uses the statistical characteristics to adapt a digital watermark decoding function used to detect or read a watermark in the media.

There are a variety of ways to classify samples of a signal. In general, the classification method classifies samples based on a signal characteristic or attribute such as signal activity or energy. Such signal characteristics may be evaluated by grouping samples into sets, computing the characteristic for each set, and then assigning the sets to classes based on their characteristics.

The method applies to different types of media signals, including audio and image signals. The media signal samples may be expressed in a spatial, temporal, or frequency domain, or in some other transform domain. For example, the samples may be frequency coefficients or some form of transform coefficients, such as subband and Discrete Cosine Transform (DCT) coefficients.

In one implementation, the method uses characteristics of the statistical distributions of the classes to assign a figure of merit to samples in the classes. In particular, it uses distribution parameters of a class as figures of merit for samples of that class. The figure of merit indicates the likelihood that a sample includes a recoverable or valid portion of a watermark signal. A watermark decoder uses the figure of merit in a read operation to calculate the value of symbols in a watermark payload. The figure of merit may be used to assign a weight to a sample in a class indicating an extent to which the sample is likely to reflect valid watermark data.

Another aspect of the disclosure is a method for reading a digital watermark in an image. The method assigns transformed samples of the media signal into classes using characteristics computed from the samples to group the samples into the classes, computes statistical characteristics of the samples in each of the classes to compute a statistical feature of each of the classes, and uses the statistical feature to compute a detection metric to decode a watermark from the samples.

Another aspect of the disclosure is a method for reading a digital watermark in a watermarked signal. This method assigns samples of the watermarked signal into classes using characteristics computed from the samples to group the samples into the classes, computes a statistical analysis of the samples in each of the classes, and uses the statistical analysis to compute a decoding function for decoding a watermark from the watermarked signal.

Yet another aspect of the disclosure is a method for estimating a watermark signal from a media signal suspected of containing the watermark signal. This method assigns samples of the suspect signal into classes based on a signal characteristic of the samples, calculates statistical characteristics of the classes, and estimates the watermark signal based on the suspect signal, the statistical characteristics of the classes, and a characteristic of the watermark signal.

Additional features and advantages of the invention will become apparent with reference to the following detailed description and accompanying drawings.

DETAILED DESCRIPTION

1.0 Overview of Classification Method

The following sections describe a method of classifying data samples of a watermarked signal to assist in detecting and extracting the watermark from the signal. This method characterizes samples to enhance the watermark detection or reading process. It assesses the likelihood that a sample has a recoverable portion of a watermark signal, and assigns a figure of merit to the samples based on this assessment. This figure of merit can then be used in watermark detection and decoding operations.

The extent to which the watermark is recoverable depends on the strength of the watermark relative to noise (e.g., the signal to noise ratio). As such, both the signal strength of the watermark signal and the noise properties of the host signal impact the extent to which the watermark signal is recoverable from a given sample. From the perspective of the watermark detector or reader, the host signal appears as noise, along with other traditional noise sources, making it more difficult to recover the watermark signal.

By classifying the samples, the detector or reader can identify which samples have a high noise component and which samples have a relatively low noise component. This knowledge can be combined with knowledge of how the watermark strength varies throughout the host signal. The combination represents an estimate of the signal to noise ratio of the watermark throughout the host signal. The watermark reader can then give more weight to samples that are likely to have a higher signal to noise ratio, improving the chances of an accurate detection or read operation.

To compute the figure of merit, the classification scheme assigns samples to classes according to a classification criteria. The criteria used to assign samples into classes should be an indicator of the watermark's strength relative to noise in the watermarked media. One effective criterion is the signal activity of the watermarked signal, which is reflected in the signal's spectral properties, and in particular, in signal energy.

After establishing the classification criteria, the classification scheme computes a statistical analysis of the samples in each class. It then assigns a figure of merit to the samples based on a statistical model of each class.

Figure 1:
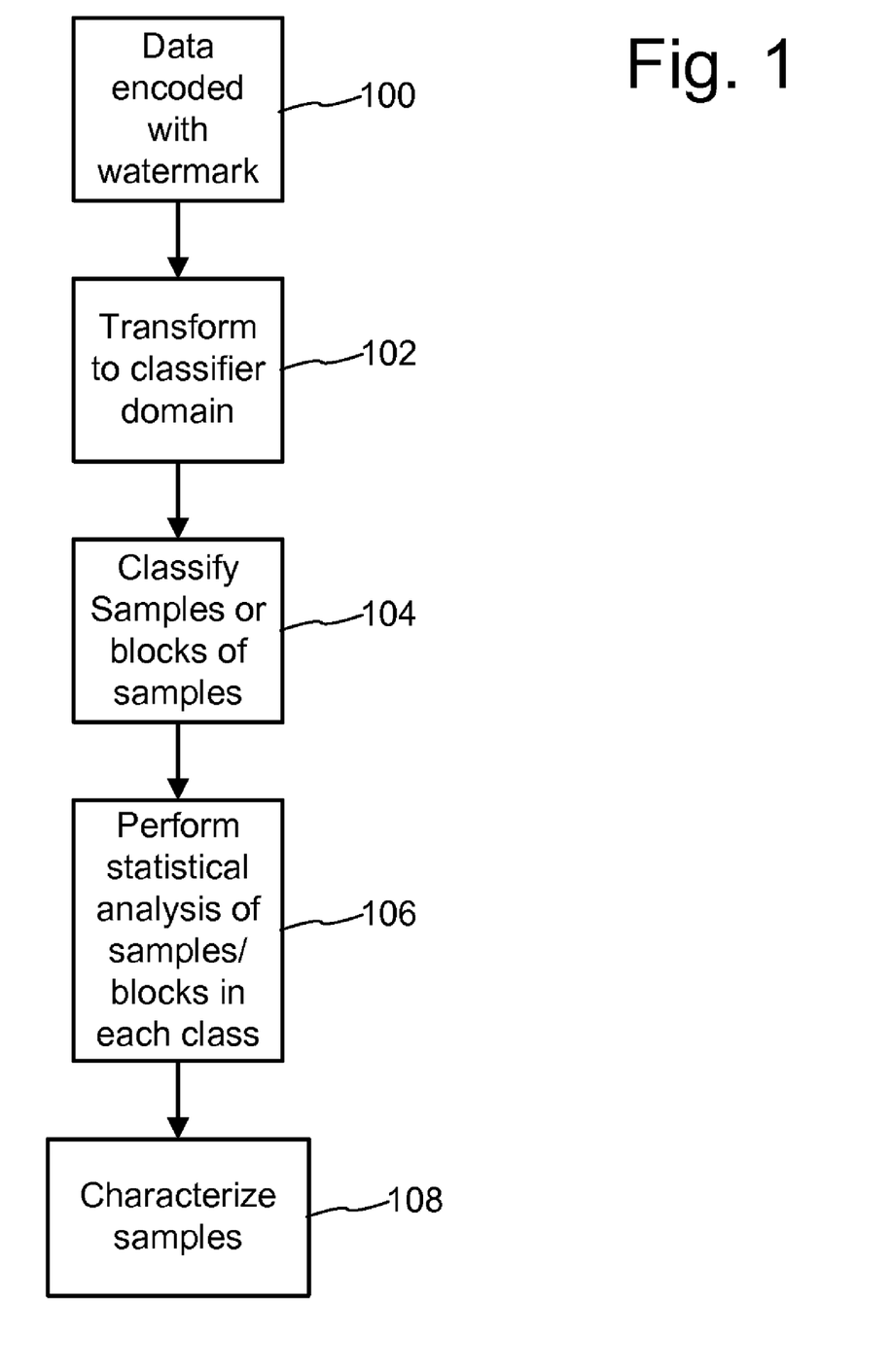
FIG. 1 is a flow diagram illustrating an overview of a method for classifying image samples for watermark detection or reading operations.

FIG. 1 is a flow diagram illustrating an overview of a method for classifying image samples for watermark detection or reading operations. The classifier operates on the watermarked data 100. It converts the samples into a transform domain in which they will be classified (102) (the classifier domain). The classifier domain is most likely the domain in which the watermark is defined. In images watermarked in a spatial frequency domain, for example, the classifier transforms the image samples from the spatial domain to the frequency domain.

Next, the classifier proceeds to assign the samples to classes. This process includes an evaluation phase, where the classifier computes the classification criteria for samples or blocks of samples. The classification criteria may be based on signal activity, as detailed below, as well as other signal properties such as statistical, spectral, perceptual, etc. Though not required, the samples are typically grouped into blocks. The classifier than computes the classification criteria per block, e.g., such as the signal activity of the block, and assigns the blocks into the classes.

Next, the classifier performs a statistical analysis of the members of each class (e.g., the samples or blocks). The statistical analysis models the probability distribution of the members in the class. The classifier then assigns a figure of merit to samples from each class based on the probability distribution of that class. Examples of figures of merit include distribution parameters of the probability distribution.

2.0 Methods of Classifying Samples

The classification scheme is selected to enhance detection and reading of a watermark signal. As such, the classification criterion is dependent upon how the watermark signal is embedded in the host signal (e.g., the watermark signal gain) and the extent to which it can be recovered from the noise introduced by the host signal and other sources.

Typically, the watermark is embedded in a portion of the signal that has higher activity.—Signal activity also influences the extent to which the embedded watermark signal may be recovered from the watermarked host signal.—Thus, one effective way to classify samples is by signal activity. Signal activity can be reflected in the spectral properties of the signal, and in particular, in its energy.

2.1 Classifying Samples by Signal Energy

The signal energy of a block of samples provides a measure of the block's signal activity. A "block" in this context is a group of samples. Typically samples are grouped together in a block based on some shared property of the samples. For example, samples that reside in the same temporal or spatial area in the signal are grouped together in a block. In digital images, for example, samples are grouped together because they fall in the same spatial area of an image.

There are a number of ways to quantify the energy of the samples in a block. One measure of energy within a block is referred to as the gain. The gain refers to the square root of the block's AC energy. Another measure of energy is the Equal Mean-Normalized Standard Deviation (EMNSD). In this approach, blocks of samples are assigned to classes so that the mean-normalized standard deviation of AC energies is the same for each class.

2.2 Classifying Samples by Spectral Properties

A signal's spectral properties also provide a measure of signal activity. The spectral characteristics of a block provide a measure of how the signal varies over time or space. For a digital image, the spectral characteristic of the block reflects how the image samples vary over the 2D space that the block covers. One way to classify the spectral content is described in Jafarkhani and Farvardin, Adaptive Image Coding Using Spectral Classification, IEEE Transactions on Image Processing, April 1998. In this paper, the authors describe how to classify spectral content of an image for image coding using a vector quantizer.

2.3 Defining Classes

In determining how to define classes, it is useful to return to the purpose of the classification in the context of watermark detecting and reading. Recall that each class is associated with a figure of merit used to weight samples in the detector or reader process. As such, the classes should be selected to differentiate the figure of merit for each class.

The classifier may select class boundaries before it evaluates the classification or performs a statistical analysis. Or alternatively, the classifier may adjust the boundaries adaptively as it evaluates the classification criteria or performs the statistical analysis so that each class has a desired statistical distribution. For example, one may design the classifier such that the class boundaries are fixed energy levels based on experimentation with sample signals. Alternatively, the classifier may be programmed to evaluate a measure of energy for each block, and then adaptively determine class boundaries such that each class has a distinguishable statistical distribution.

2.4 Classifying Samples in Different Domains

Though not required, the classifier typically classifies signal samples in the domain in which the watermark is defined. Digital watermark research has produced a myriad of ways to embed a watermark signal into a host signal. Two categories that are often cited are frequency domain and spatial, but there are many other. In general, the watermark embedder modulates a host signal with a watermark signal in a selected transform domain (e.g., spatial, spatial frequency, etc.) A variety of spread spectrum and signal scattering techniques may be employed to hide the watermark, and make it more impervious to tampering or removal.

The following subsections highlight some of the most common transform domains in which a watermark signal is defined and in which the host signal's samples are classified.

2.5 Transform Domain Coding

Transform domain coding refers to a broad category of watermarking in which the watermark signal is defined in a transform domain. Transform domain encoders typically transform the host signal into a frequency domain, modulate the transformed signal with the watermark signal, and then return the watermarked signal to its native domain.

Figure 2:
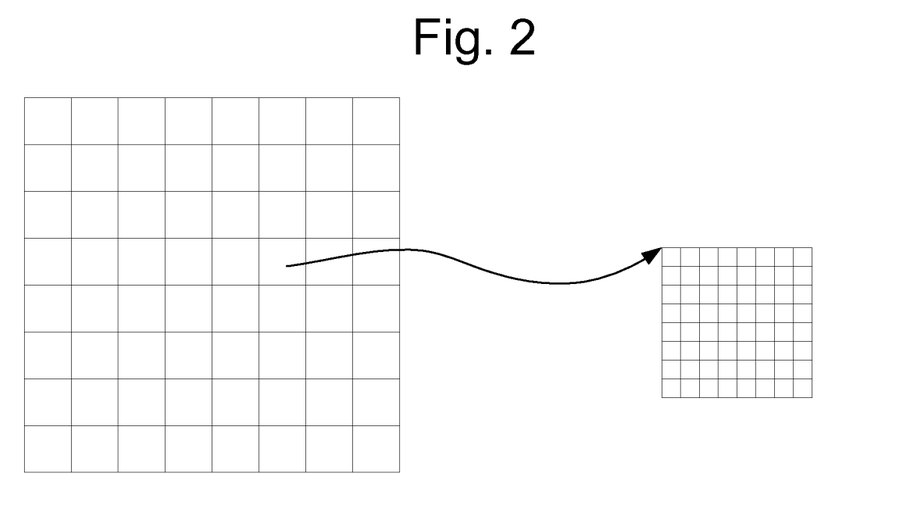
FIG. 2 is a diagram depicting a Discrete Cosine Transform of an image.

In the field of image processing and coding, there are many different types of frequency domain transforms, such as a discrete cosine transform (DCT), Fourier transform, Karhunen-Loeve transform (KLT), wavelet transform etc. A DCT coder, for example, transforms a square region of image samples in the spatial domain to a set of frequency coefficients in the spatial frequency domain. In particular, DCT based image coders typically transform an 8 by 8 pixel block into an 8 by 8 block of spatial frequency components. FIG. 2 shows an example of an image subdivided into square blocks in the spatial domain, and a corresponding transformed block of 64 frequency coefficients.

Figure 3:
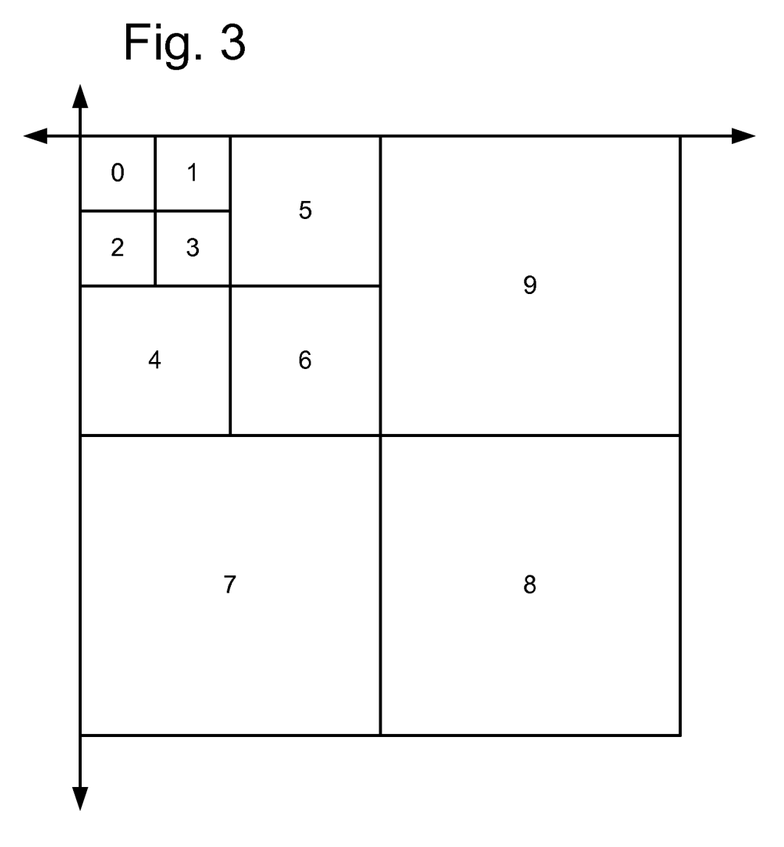
FIG. 3 is a diagram depicting a Discrete Wavelet Transform of an image.

Subband coding techniques, like a discrete wavelet transform, are similar to a DCT approach yet organize frequency samples into blocks in a different way than the DCT transform. FIG. 3 depicts a spatial frequency domain plot showing an example of frequency subbands. The transform depicted in FIG. 3 hierarchically subdivides the frequency domain into subbands (0 to 9). The frequency of the samples in each subband (0 to 9) increases from upper left to lower right. As shown, the subband or Discrete Wavelet Transform (DWT) coder hierarchically sub-divides the lowest frequency component into four quadrants. Typically, image coders create these subbands by passing the image through a bi-directional filter. Subbands 1, 5, and 9 represent a frequency orientation of the signal in the horizontal direction, subbands 2, 4 and 7 represent a frequency orientation in the vertical direction, and subbands 3, 6 and 8 represent a frequency orientation in the diagonal direction.

To create each level of decomposition, the subband coder passes the image through a high and low pass filtering process in the horizontal and vertical dimensions. Each stage performs a high pass and a low pass filtering process. A row high pass filter creates the lower half of the decomposition (e.g., the half containing blocks 2 and 3), and a row low pass filter creates the upper half (e.g., the half containing blocks 0 and 1). The next stage then performs high and low pass filtering operations on the columns of the upper and lower halves. The column high pass operation on the lower half yields the lower-right quadrant (called HH, block 3), and the column low pass yields the lower lower-left quadrant (called HL, block 2). Finally, the column high pass operation on the upper half yields the upper-right quadrant (called LH, block 1), and the column low pass yields the upper-left quadrant (called LL, block 0). Each sample in the respective quadrant corresponds to spatial samples in a filter window centered on the coordinates of the sample (e.g., 9 by 9 pixel window). Since each level of decomposition operates on the previous level's results, the samples correspond to increasingly larger spatial areas.

Once converted to the target transform domain (the classifier domain), the classifier organizes the samples for the statistical analysis stage. In implementations where statistics are evaluated based on blocks of samples, the classifier group samples into blocks. The preferred way to group the samples for images is based on spatial position. For example, DCT coefficients may be assigned to subbands, and the coefficients in each subband grouped in spatial blocks corresponding to a fixed number of adjacent DCT blocks. Similarly, the wavelet coefficients in each subband may be grouped in spatial blocks.

2.6 Spatial Domain Coding

Spatial domain watermarks are defined and applied to a host signal in the spatial domain. In the process of watermarking an image in the spatial domain, for example, the encoder modulates the value of image samples in the spatial domain. Since most images are already in the spatial domain, there is no need to transform them into the domain in which the watermark is defined.

3.0 Example Implementations of Classification Schemes

This section describes example classification schemes used to enhance watermark detection and reading. The first example applies to subband coders (e.g., a DWT coder), while the second applies to a DCT coder. In a subband coder, such as a DWT based coder, the classifier begins by transforming a watermarked signal into the classifier domain, namely, a series of subbands. As described above, the subband coder produces a series of subbands, each including a set of coefficients.

Next, the classifier groups the coefficients into blocks for statistical analysis. Each subband contains the coefficients for a particular frequency band. The classifier then groups samples in each subband into blocks based on the position within the watermarked signal.

After assigning samples to blocks, the classifier evaluates each block's signal activity by computing a measure of the signal energy. Specifically, it computes the mean of the sample values in each block, subtracts the mean from each sample value, and computes a sum of squares of the mean-removed values. Next, the classifier assigns the blocks for each subband into classes based on their signal energy.

Preferably it assigns blocks to different classes so that each class has a distinctly different distribution. The classifier assigns a figure of merit to the samples such that those samples which are more likely to have a reliable watermark are given greater weight in reader and detector operations.

Figure 4:
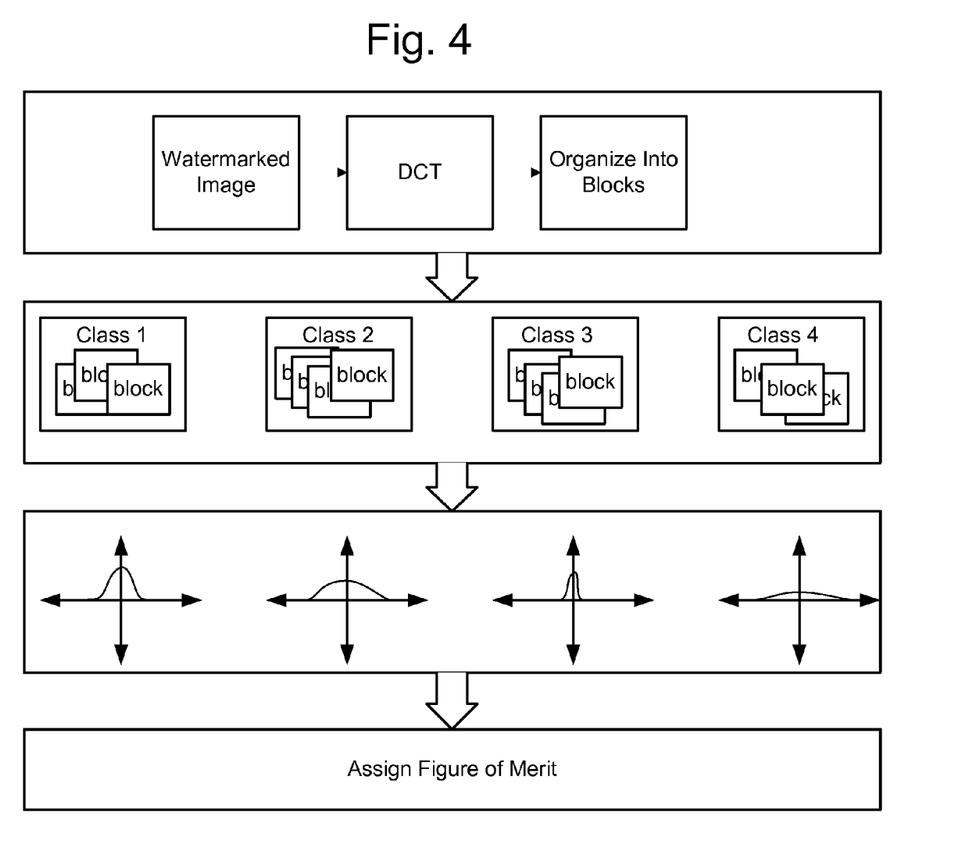
FIG. 4 is a diagram depicting an example of a classification scheme used to improve image watermark detection and reading.

FIG. 4 illustrates another example implementation of a classification scheme used to enhance image watermark detection and reading. The classifier begins by transforming a watermarked image into the classifier domain shown here as a DCT. As described above, the DCT produces a series of transformed blocks, each with 64 frequency coefficients.

Next, the classifier groups the blocks for statistical analysis. In this example implementation, it partitions the blocks into four classes. The classifier evaluates each block's signal activity by computing a measure of the signal energy. Specifically, it computes the mean of the sample values in each block, subtracts the mean from each sample value, and computes a sum of squares of the mean-removed values. Next, the classifier assigns the blocks into classes based on their signal energy. FIG. 4 depicts four different classes, along with the group of blocks assigned to it.

Preferably it assigns blocks to different classes so that each class has a distinctly different distribution. FIG. 4 shows an example of the distribution of block energies for four different classes. Note that each of the four classes have distinctly different variances. The classes with larger variances are more noisy and less likely to yield a reliable watermark signal. Conversely, the classes with a more narrow variance are more likely to yield a reliable watermark signal. The classifier assigns a figure of merit to the samples such that those samples which are more likely to have a reliable watermark are given greater weight in reader and detector operations.

4.0 Embedding the Watermark

As discussed previously, classification techniques apply to watermarking schemes in a variety of domains, including the spatial and frequency domains. The following example illustrates an image watermark classification scheme in a DCT domain.

Start with: host image $x=(x_1, x_2, \ldots, x_L)$, watermark payload $V \in \{1, 2, \ldots, M\}$, $M=2^{128}$.

Now do an 8×8 DCT of the host image.
Each sample of $\hat{x}$ is described by an index pair (b,n).
b tells which 8×8 transform block the sample is from.
n tells which if the 64 transform coefficients contains the sample.
Assume the dimensions of the host image are 512×512.
The embedder can group the transformed coefficients in two ways:
1. By block. The host image has 64×64-4096 DCT blocks, each with 8×8=64 samples.
   Blocks are indexed by b, samples within blocks by n.
2. By coefficient. The host image has 64 coefficient blocks, each with 4096 samples.
   Coefficients are indexed by n, and samples within coefficients by b.

In this example, the embedder encodes 128 bits evenly across all 64 DCT coefficients. Each bit will modify 32 samples from each DCT coefficient.

Let $S_{i,n}$ be the set of indices b corresponding to the samples modified by bit $B_i$ of the payload in coefficient n.

The embedder constructs a perceptual mask $\alpha$ so that $\alpha_{b,n}$ represents the maximum amount that it can change transform coefficient sample $\hat{x}_{b,n}$. The embedder also generates a pseudorandom key p which is a sequence of +1 or −1 values. The watermarked image transform $\hat{y}$ can be expressed as:

$$\hat{y}_{b,n} = \hat{x}_{b,n} + \alpha_{b,n} p_{b,n}(2B_i - 1)$$

where $b \in S_{i,n}$. Taking the inverse DCT gives the watermarked image:

$$\hat{y} = DCT^{-1}(\hat{y}).$$

The watermarked image y is received as z, given by p(z|y). After the encoding process, y may undergo various transformations or distortions, resulting in a potentially distorted version of y referred to as z.

5.0 Decoding the Watermark

This section describes an example of a decoder compatible with the encoder described in the previous section and similar to the decoder depicted in FIG. 4.

Starting from z, the decoder computes the DCT: $\hat{z} = DCT(z)$.

Next, it groups $\hat{z}$ by DCT blocks; The DCT yields a set of 4096 blocks, each of 64 DCT samples.

$\hat{z}_{b,n}$ is the DCT sample from block b and coefficient n.

Now the decoder partitions the set of blocks into four classes as follows:
1. Remove the mean from the DC coefficient (so that all coefficients have approximately zero mean).
2. For each block, calculate its AC energy–the sum of squares of block values.
   Let $E_b$ be the AC energy of block b.
3. Choose 3 thresholds $T_1 > T_2 > T_3$
4. Define classes:
   class 1 as those blocks b with $E_b > T_1$. This is the "high activity class".
   class 2 as those blocks b with $T_2 < E_b \leq T_1$.
   class 3 as those blocks b with $T_3 < E_b \leq T_2$.
   class 4 as those blocks b with $E_b \leq T_3$. This is the "low activity class".

Group $\hat{z}$ by coefficients: there are 64 coefficient blocks, each with 4096 samples. Break each c coefficient into four class subblocks, so that $C_{n,j}$ is a class subblock from coefficient block n and j=1, 2, 3, 4.

$$\hat{z}_{b,n} \in C_{n,j}$$

if block b is in class j.

There are a total of 4×64=256 class subblocks. The distribution of samples in each class subblock is modeled as a parameterized distribution:

$$f_z(z) = Ae^{-|\beta z|^c}, A = \frac{\beta c}{2\Gamma(1/c)}, \beta = \frac{1}{\sigma}\left(\frac{\Gamma(3/c)}{\Gamma(1/c)}\right)^{\frac{1}{2}}.$$

The two parameters c and σ describe the distribution fully. These are estimated from the set of samples in the class subblock, e.g. by the Kolmolgorov-Smirnov test.

Let $c_{b,n}$ and $\sigma_{b,n}$ be the estimated parameters for the distribution of the class subblock containing $\hat{z}_{b,n}$.

The watermark decoder chooses the watermark payload which maximizes the probability of the received image transform $\hat{z}$. Let W(i) be the watermark which is added to the original image transform $\hat{x}$ if the watermark payload V is i. The decoder chooses the payload, l, satisfying $$\ln\frac{f_{\hat{z}}(\hat{z}|V=l)}{f_{\hat{z}}(\hat{z}|V=m)} = \ln\frac{f_{\hat{x}}(\hat{z}-W(l))}{f_{\hat{x}}(\hat{z}-W(m))} > 0, \forall m \neq l.$$

Using our estimated distributions and assuming that the DCT coefficients are independent, we must satisfy $$\sum_{n=1}^{64}\sum_{b=1}^{4096} \frac{|\hat{z}_{b,n} - W(m)_{b,n}|^{c_{b,n}} - |\hat{z}_{b,n} - W(l)_{b,n}|^{c_{b,n}}}{\sigma_{b,n}^{c_{b,n}}} > 0, \forall m \neq l.$$

By rewriting the probabilities, we can form a bit-wise decoder using the sufficient statistic $r_i$.

$$r_i \equiv \sum_{n=1}^{64}\sum_{b \in S_{i,n}} \frac{|\hat{z}_{b,n} + \alpha_{b,n} p_{b,n}|^{c_{b,n}} - |\hat{z}_{b,n} - \alpha_{b,n} p_{b,n}|^{c_{b,n}}}{\sigma_{b,n}^{c_{b,n}}}.$$

Decoding for bit i of the watermark payload is $$\hat{b}_i = \text{sign}(r_i).$$

Note that the decoding process uses the distribution parameters $c_{b,n}$ and $\sigma_{b,n}$ as figures of merit. A DCT sample with a larger value $c_{b,n}$ is given greater weight, while a sample with a larger $\sigma_{b,n}$ is given less weight in determining the value of a watermark payload bit. Note also that the figure of merit can also be combined with information about the embedding strength of the watermark signal to decode the watermark payload.

A similar approach can be applied to subband coders, such as a DWT based coder.

The above approach can also be used as a pre-filtering process to estimate the original, un-watermarked signal. A pre-filtering process not using classification uses the received signal to form an estimate of the distribution of the original un-watermarked signal. The estimate of the original signal distribution is combined with a priori knowledge of the distribution of the watermark signal to obtain an estimate of the watermark signal. An example description of applicable estimation techniques applied to estimating an original image to which noise has been added is contained in "Bayesian Denoising of Visual Images in the Wavelet Domain", Eero P. Simoncelli, Published as: "Bayesian Inference in Wavelet Based Models", eds. P Muller and B Vidakovic, Chapter 18, pp 291-308, Lecture Notes in Statistics, vol. 141, Springer-Verlag, New York, 1999.

Classification may be added to the pre-filtering process to provide a more nuanced model for the distribution of the original un-watermarked signal. Instead of modeling the original signal as having a single distribution, classification considers that different samples of the original signal may have different distributions. When the original signal is an image, this approach fits especially well with the known non-stationary nature of image statistics. By providing a more realistic model of the original signal statistics, classification allows the estimation process to yield a more reliable estimate of the watermark signal.

To illustrate how classification may be used as a pre-filtering process to estimate a watermark signal, consider the following example. In this example, the watermark is applied to a host signal based on a linear combination of a watermark signal W and the original, un-marked host signal X to produce a watermarked signal Y, where X, Y, and W are vectors (e.g., one or more dimensional vectors depending on the nature of the host signal). An expression of this watermark encoding process is:

$$X+W=Y.$$

This expression is merely illustrative; other linear combinations of the watermark and host signal can be used. Also, it is important to note that this expression is generally applicable to different forms of the signal. For example, the vectors may represent media signal samples in a spatial, temporal, or frequency domain, or some other transform domain.

In addition, the watermark signal may be a function of the host signal. For example, a gain vector applied to the watermark signal may be a function of the host signal: $g=f(X)$. A gain vector g may be applied by multiplying it with the watermark signal and adding the result to the host signal: $W_g=gW$ and $Y=W_g+X$. This type of adaptive gain is useful to make the watermark less perceptible, while maintaining or improving the strength of the watermark signal, $W_g$.

The distribution of the watermark signal W is known. In cases where the watermark signal is host signal dependent, the distribution of the watermark signal can be estimated based on the watermarked signal Y, and in particular, based on the version of the watermarked signal Y' received by the watermark decoder.

In this example, a classification scheme is used to compute an estimate of the watermark signal. Then, a watermark decoder extracts one or more message symbols (e.g., binary symbols) from the estimated watermark signal. The classification scheme, in this case, is implemented as a pre-processing stage to the decoder, and it operates on a potentially distorted version of the watermarked signal Y'.

First, the pre-processor classifies and estimates the distribution of the classes of the original, un-watermarked signal. To accomplish this, it assumes that the distribution of classes of Y' are similar to distributions of classes of X. The classifier operates in a similar fashion as described above. In particular, it groups the samples of Y' into classes based on a signal characteristic like signal energy, and then models the distribution of each class.

Next, the classifier models the distribution of W. Because the implementer of the decoder knows how the encoder generates W, the decoder knows the distribution of W. If the encoder made the watermark signal dependent on the host signal, then it estimates the distribution of the watermark signal based on Y'. For example, if the signal adaptive watermark signal is $W_g$, then the distribution of g can be estimated based on Y', and the distribution of $W_g$ computed based on the distributions of g and W.

Having classified and modeled the distribution of both Y' and W (or $W_g$ as the case may be), the classifier proceeds to estimate the watermark signal. Given Y', the best mean square error estimate of each sample of the watermark signal W (or $W_g$) is given by the expectation function E(W|Y').

In particular, the pre-processor estimates samples of W using samples of Y', the probability distributions for the classes of Y' and the distribution of the corresponding sample of W. Each sample of W may have its own distribution.

The expectation function may be expressed as:

$$E(x)=\int xp(x)dx,$$

where p(x) is the probability of x.

The expectation function E(W|Y') may be expressed as:

$$E(w|y')=\int P_{w|y'}(w|y')wdw,$$

where w is a watermark signal sample, y' is sample in Y, and P is a probability distribution.

An estimate of a watermark sample may then be calculated as:

$$\hat{w} = \frac{\int P_x(y-w)P_w(w)dw}{\int P_x(y-w)P_w(w)dw}$$

where the probability distribution $P_x$ of classes of X are estimated from the probability distributions of classes of Y'.

The decoder then proceeds to decode a watermark message, which may be one or more symbols, from the estimated watermark signal.

CONCLUDING REMARKS

Having described and illustrated the principles of the technology with reference to specific implementations, it will be recognized that the technology can be implemented in many other, different, forms. For example, the classification scheme may be applied to watermarking technology for audio and image signals, including video signals. A classification scheme may be used to enhance watermark detecting and reading watermark payload symbols (e.g., binary or M-ary symbols). The methods described above may be implemented in hardware, software, or a combination of software and hardware. Software implementations may be stored on conventional computer readable media, such as optical memory devices, magnetic memory devices, To provide a comprehensive disclosure without unduly lengthening the specification, applicants incorporate by reference the patents and patent applications referenced above. These patents and patent applications provide additional details about implementing watermarking systems.

The particular combinations of elements and features in the above-detailed embodiments are exemplary only; the interchanging and substitution of these teachings with other teachings in this and the incorporated-by-reference patents/applications are also contemplated.

I claim:

1. A method for reading a digital watermark in a media signal, the method comprising:
   using a computing device programmed to perform the acts of:
   assigning sets of media signal samples into classes;
   computing statistical characteristics of the media samples for the classes; and
   using the statistical characteristics to adapt a digital watermark decoding function used to detect or read a watermark in the media signal.

2. The method of claim 1, wherein the media signal is an audio signal.

3. The method of claim 1, wherein the media signal is an image signal.

4. The method of claim 3, wherein the image signal samples are expressed in a frequency domain.

5. The method of claim 4, wherein the image signal samples are spatial frequency coefficients.

6. The method of claim 1, wherein the samples are in a spatial or temporal domain.

7. The method of claim 1, wherein using the statistical characteristics comprises assigning a figure of merit to a sample indicating a likelihood that the sample includes a recoverable portion of a watermark signal; and using the figure of merit in a read operation.

8. The method of claim 7, wherein assigning a figure of merit comprises assigning a weight to the sample indicating an extent to which the sample is likely to reflect valid watermark data.

9. The method of claim 1, wherein using the statistical characteristics comprises assigning a figure of merit to a sample indicating a likelihood that the sample includes a recoverable portion of a watermark signal; and using the figure of merit in a watermark decoding operation.

10. The method of claim 9, wherein assigning a figure of merit comprises assigning a weight to the sample indicating an extent to which the sample is likely to reflect valid watermark data.

11. A non-transitory computer readable medium on which is stored instructions, which if executed by a computing device, cause the computing device to perform operations comprising:
    assigning sets of media signal samples into classes;
    computing statistical characteristics of the media samples for the classes; and
    using the statistical characteristics to adapt a digital watermark decoding function used to detect or read a watermark in the media signal.

12. A method for reading a digital watermark in a media signal, the method comprising:
    using a computing device programmed to perform the acts of:
    assigning transformed samples of the media signal into classes using characteristics computed from the samples to group the samples into the classes;
    computing statistical characteristics of the samples in each of the classes to compute a statistical feature of each of the classes; and
    using the statistical feature to compute a detection metric to decode a watermark from the samples.

13. The method of claim 12, wherein the characteristics further comprise signal activity of the samples, and the signal activity of the samples is evaluated and the samples are assigned to the classes based on signal activity.

14. A non-transitory computer readable medium on which is stored instructions, which if executed by a computing device, cause the computing device to perform operations comprising:
    assigning transformed samples of the media signal into classes using characteristics computed from the samples to group the samples into the classes;
    computing statistical characteristics of the samples in each of the classes to compute a statistical feature of each of the classes; and
    using the statistical feature to compute a detection metric to decode a watermark from the samples.

15. A method for reading a digital watermark in a watermarked signal, the method comprising:
    using a computing device programmed to perform the acts of:
    assigning samples of the watermarked signal into classes using characteristics computed from the samples to group the samples into the classes;
    computing a statistical analysis of the samples in each of the classes; and
    using the statistical analysis to compute a decoding function for decoding a watermark from the watermarked signal.

16. The method of claim 15, wherein sets of samples are assigned to classes based on a signal characteristic of the samples in the sets.

17. The method of claim 16, wherein the signal characteristic is a measure of signal energy.

18. A non-transitory computer readable medium on which is stored instructions, which if executed by a computing device, cause the computing device to perform operations comprising:
    assigning samples of the watermarked signal into classes using characteristics computed from the samples to group the samples into the classes;
    computing a statistical analysis of the samples in each of the classes; and
    using the statistical analysis to compute a decoding function for decoding a watermark from the watermarked signal.

19. A method for estimating a watermark signal from a media signal suspected of containing the watermark signal, the method comprising:
    using a computing device programmed to perform the acts of:
    assigning samples of the suspect signal into classes based on a signal characteristic of the samples;
    calculating statistical characteristics of the classes; and
    estimating the watermark signal based on the suspect signal, the statistical characteristics of the classes, and a characteristic of the watermark signal.

20. A non-transitory computer readable medium on which is stored instructions, which if executed by a computing device, cause the computing device to perform operations comprising:
    assigning samples of the suspect signal into classes based on a signal characteristic of the samples;
    calculating statistical characteristics of the classes; and
    estimating the watermark signal based on the suspect signal, the statistical characteristics of the classes, and a characteristic of the watermark signal.

* * * * *

UNITED STATES PATENT AND TRADEMARK OFFICE
CERTIFICATE OF CORRECTION

| | | |
|---|---|---|
| PATENT NO. | : 7,958,365 B2 | |
| APPLICATION NO. | : 12/408529 | |
| DATED | : June 7, 2011 | |
| INVENTOR(S) | : Brunk | |

It is certified that error appears in the above-identified patent and that said Letters Patent is hereby corrected as shown below:

Column 1, line 4, delete "TECHNICAL FIELD" and insert -- CROSS-REFERENCE TO RELATED APPLICATION --.

Signed and Sealed this
Eighteenth Day of October, 2011

David J. Kappos
*Director of the United States Patent and Trademark Office*